Patented Aug. 12, 1947

2,425,523

UNITED STATES PATENT OFFICE 2,425,523

PHENYL AND TOLYL ALPHA-ACETOXY-PROPIONATE AND PROCESS FOR THEIR PREPARATION

Edward M. Filachione, Philadelphia, and Charles H. Fisher, Abington, Pa., assignors to United States of America, as represented by the Secretary of Agriculture No Drawing. Application November 25, 1943, Serial No. 511,682

10 Claims. (Cl. 260—484)

(Granted under the act of March 3, 1883, as amended April 30, 1928; 370 O. G. 757)

This application is made under the act of March 3, 1883, as amended by the act of April 30, 1928, and the invention herein described, if patented, may be manufactured and used by or for the Government of the United States of America for governmental purposes without the payment to us of any royalty thereon.

The present invention relates to new and useful compositions of matter, namely, phenyl alpha-acetoxypropionate, and tolyl alpha-acetoxypropionate, having the formulae:

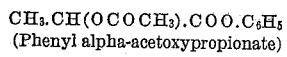
(Phenyl alpha-acetoxypropionate)

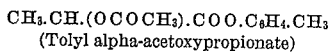
(Tolyl alpha-acetoxypropionate)

The object of our invention is the production of compounds that are useful as solvents, plasticizers, chemical intermediates and as starting materials in the manufacture of aryl acrylates, such as phenyl acrylate and tolyl acrylate, which are substances polymerizable into plastic, semi-solid, or solid materials useful in industry because of their tensile strength, elasticity, plasticity, resistance to water, organic liquids and gases, and other desirable properties.

It is well known (Burns, Jones and Ritchie, J. Chem. Soc. 1935, 400–6, 714–7; Claborn, U. S. 2,222,363, November 19, 1940; Claborn, U. S. 2,229,997, January 28, 1941; Smith, Fisher, Ratchford and Fein, Ind. Eng. Chem. 34, 473–9 (1942)) that methyl alpha-acetoxypropionate can be decomposed thermally to yield as a principal product methyl acrylate, which can be converted by polymerization into substances useful in the plastics and related industries. However, the alkyl alpha-acetoxypropionates of higher molecular weight have been observed to be unsuitable for production of the corresponding alkyl acrylates because of the preponderance of undesirable reactions which lead to the formation of products other than the acrylates. Furthermore, the alkyl acrylates corresponding to the alkyl alpha-acetoxypropionates of higher molecular weight yield polymers which lack the properties considered desirable in industry.

We have found that the presence of an aromatic nucleus attached to the carboxyl group decreases the undesirable side reactions encountered in the pyrolysis of the alkyl alpha-acetoxypropionates of higher molecular weight, and that the phenyl and substituted phenyl alpha-acetoxypropionates can be converted readily and in good yields into phenyl and substituted phenyl acrylates (as shown below), which can be polymerized and interpolymerized into materials useful in industry:

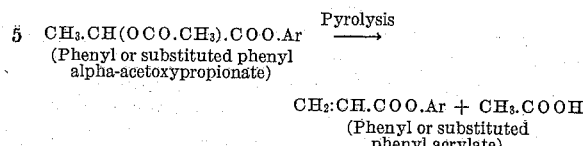

where Ar is phenyl or a substituted phenyl group.

Phenyl and tolyl alpha-acetoxypropionates can be made by treatment of alpha-acetoxypropionyl chloride, alpha-acetoxypropionic anhydride, or alpha-acetoxypropionic acetic anhydride with phenol and cresol, respectively. Phenyl and tolyl alpha-acetoxypropionates may also be made by acidolysis or ester interchange from alpha-acetoxypropionic acid and phenyl acetate or tolyl acetate, respectively. Acetoxypropionic acid, acetoxypropionyl chloride and the anhydrides may be made conveniently from lactic acid.

Our invention is illustrated by the following examples:

Example I 1.0 mole of alpha-acetoxypropionyl chloride was added to 1.0 mole of phenol. The mixture was warmed by a water bath (the temperature rose gradually to 100° C.) until the evolution of hydrogen chloride ceased. The product, phenyl alpha-acetoxypropionate, was isolated by distillation: B. P. 110°–111° C. at 2–3 mm.; $N_D$ at 20° C.—1.4860; d. at 20° C.—1.1134. Molecular refraction: (calcd.), 52.70; (obs.), 52.65. The yield was 88 percent of the theoretical.

Example II

To 0.5 mole of phenol was added 200 g. of 10 percent aqueous sodium hydroxide. This was treated, with cooling and vigorous stirring, with 0.5 mole of alpha-acetoxypropionyl chloride. The temperature of the mixture ranged from —5° to 5° C. Stirring was continued for 2 to 3 hours after the addition of the acid chloride, which took approximately 0.5 hour. The oily layer was taken up in ether, the ether solution was washed with water and dried, and the solvent was removed. Upon distillation a 65 percent yield of phenyl alpha-acetoxypropionate was obtained.

Example III

A mixture of 0.5 mole of phenol, 0.5 mole of alpha-acetoxypropionic acid and 0.55 mole of phosphorous oxychloride was heated on a steam bath for 1.5 hours. After standing over night, the mixture was poured into cold water and extracted with ether. The ether layer was washed with cold 5 percent sodium hydroxide solution until no coloration appeared in the wash solution, then with water, and dried over anhydrous sodium sulfate. Distillation gave a 30 percent yield of phenyl alpha-acetoxypropionate.

*Example IV*

A mixture of 0.5 mole of alpha-acetoxypropionic acid, 0.7 mole of phenyl acetate, and 0.5 ml. of concentrated sulfuric acid was heated at 125° to 140° C. for 5 hours, after which 2.0 g. of anhydrous sodium acetate was added and the mixture was distilled. A fraction was collected boiling at 112° to 115° C. at 1–2 mm. This fraction contained about 60 percent of unreacted alpha-acetoxypropionic acid which was removed by washing an ether solution of this fraction with water, and then with sodium bicarbonate. After drying, the solvent was removed. In this manner a 45 percent yield (20 percent conversion) of phenyl alpha-acetoxypropionate was obtained.

*Example V*

A mixture of 1.0 mole of ortho-cresol and 1.0 mole of alpha-acetoxypropionyl chloride was heated on the steam bath until evolution of hydrogen chloride ceased. Distillation gave an 86 percent yield of ortho-tolyl alpha-acetoxypropionate (B. P. 112° to 113° C. at less than 1 mm. of mercury, $N_D$ at 20° C.—1.4860; d. at 20° C. referred to water at 4° C.—1.1256).

Having thus described our invention, we claim:

1. The process of preparing aryl esters of alpha-acetoxypropionic acid which comprises reacting alpha-acetoxypropionyl chloride with a compound selected from the group consisting of phenol, a metallic salt of phenol, cresol and metallic salts of cresol.
2. The process of preparing phenyl alpha-acetoxypropionate which comprises reacting alpha-acetoxypropionyl chloride with phenol.
3. The process of preparing tolyl alpha-acetoxypropionate which comprises reacting alpha-acetoxypropionyl chloride with cresol.
4. The process of preparing ortho-tolyl alpha-acetoxypropionate which comprises reacting alpha-acetoxypropionyl chloride with ortho-cresol.
5. Phenyl alpha-acetoxypropionate represented by the formula: $CH_3.CH(OCOCH_3).COO.C_6H_5$.
6. Ortho-tolyl alpha-acetoxypropionate, represented by the formula:

$$CH_3.CH(OCOCH_3).COO.C_6H_4.CH_3$$

7. The process of preparing aryl esters of alpha-acetoxypropionic acid which comprises reacting alpha-acetoxypropionic chloride with a compound selected from the group consisting of phenol, the sodium salt of phenol, cresol and the sodium salts of cresol.
8. An alpha-acetoxypropionate represented by the formula $CH_3.CH(OCOCH_3).COO.Ar$, where Ar is a radical selected from the group consisting of phenyl and tolyl.
9. The process of preparing phenyl alpha-acetoxypropionate which comprises mixing alpha-acetoxypropionyl chloride with phenol and heating the mixture until the evolution of hydrogen chloride ceases.
10. The process of preparing ortho-tolyl alpha-acetoxypropionate which comprises mixing alpha-acetoxypropionyl chloride with ortho-cresol and heating the mixture until the evolution of hydrogen chloride ceases.

EDWARD M. FILACHIONE.
CHARLES H. FISHER.

REFERENCES CITED

The following references are of record in the file of this patent:

UNITED STATES PATENTS

| Number | Name | Date |
| --- | --- | --- |
| 2,258,870 | Thurston | Oct. 14, 1941 |

OTHER REFERENCES

Burns et al., Journal Chem. Soc. (London), 1935, pp. 400–406.

Freudenberg, "Berichte," vol. 60, 1927, page 2456.

Hoeflake, "Chemical Abstracts," vol. 11, pp. 42 and 43 (1917).

Karrer, "Organic Chemistry," Nordman Pub. Co., N. Y., 1938, page 393.

Einhorn, "Chemical Abstracts," vol. 10, page 2218 (1916).